United States Patent [19]

Zaloof

[11] Patent Number: 4,488,731
[45] Date of Patent: Dec. 18, 1984

[54] MULTIPLE-JAW CHUCK
[76] Inventor: Moshe Zaloof, 14 Hamelacha St., Or Yehuda, Israel
[21] Appl. No.: 415,925
[22] Filed: Sep. 8, 1982
[30] Foreign Application Priority Data
　Jun. 8, 1982 [IL]　Israel ....................................... 66006
[51] Int. Cl.³ ............................................. B23B 31/16
[52] U.S. Cl. .................................... 279/121; 279/123; 279/4
[58] Field of Search .................... 279/123, 121, 2 R, 3, 279/4, 57, 50, 60, 65, 74, 110; 308/3 R, 3 A; 269/136, 234, 217

[56] References Cited
U.S. PATENT DOCUMENTS

| 1,305,138 | 5/1919 | McCellan | 279/121 |
| 2,023,869 | 12/1935 | Buell | 269/234 |
| 3,171,663 | 3/1965 | Stark | 279/4 |
| 3,633,929 | 1/1972 | Marawski | 279/60 |
| 4,198,067 | 4/1980 | Steinberger | 279/123 |
| 4,264,112 | 4/1981 | Magnuson | 308/3 |

Primary Examiner—Z. R. Bilinsky
Assistant Examiner—Thomas M. Kline
Attorney, Agent, or Firm—Benjamin J. Barish

[57] ABSTRACT

A multiple-jaw chuck comprises a housing and a drive cylinder driven parallel to the longitudinal axis of the housing and driving a plurality of chuck jaws towards and away from the housing longitudinal axis. The chuck includes one or more axially-extending pins for each chuck jaw fixed to the drive cylinder at an acute angle to the housing longitudinal axis. Each chuck jaw includes a bore for each pin and formed at the same acute angle, such that each chuck jaw is driven radially towards and away from the longitudinal axis of the housing when the drive cylinder is driven parallel to the housing axis. Each chuck jaw further includes an inner drive arm coupled to the drive cylinder, and an outer workpiece-engaging arm, each of the drive arms being of substantially cylindrical configuration and movable in a bore of corresponding cylindrical configuration formed in the housing.

15 Claims, 6 Drawing Figures

MULTIPLE-JAW CHUCK

BACKGROUND OF THE INVENTION

The present invention relates to multiple-jaw chucks, such as those used to clamp a workpiece during a machining operation.

A popular type of multiple-jaw chuck widely used today comprises a housing and a drive cylinder pneumatically driven parallel to the longitudinal axis of the housing and coupled to a plurality of chuck jaws to drive them radially towards and away from the housing longitudinal axis in order to clamp or disengage the workpiece. This popular type of chuck includes a rib-and-slot coupling of T-configuration between the drive cylinder and each of the chuck jaws, and a further rib-and-slot guide also of T-configuration to guide the movement of the chuck jaws while they are driven by the cylinder. Such known constructions, however, have a number of disadvantages. Thus, forming the T-configuration for the rib-and-slot coupling and for the guide involves high-precision, time-consuming machine operations which increase the manufacturing cost of the chuck. Moreover, with such T-configuration metal-to-metal contact faces, it is very difficult, no matter how high the precision, to preclude the entry of dirt between the metal faces particularly at the sharp corners, which dirt increase the wear on the parts and shortens their useful life.

SUMMARY OF THE INVENTION

An object of the present invention is to provide a multiple-jaw chuck having advantages in the above respects.

According to one aspect of the present invention, there is provided a multiple-jaw chuck comprising a housing and a drive cylinder driven parallel to the longitudinal axis of the housing and driving a plurality of chuck jaws towards and away from said housing longitudinal axis, characterized in that each of the chuck jaws is coupled to the drive cylinder by a pin fixed to one (i.e., the chuck jaws or the drive cylinder) received in a bore formed in the other, both extending at an acute angle to the longitudinal axis of the housing, such that each of the chuck jaws is driven radially towards and away from said longitudinal axis of the housing when the drive cylinder is driven parallel to the longitudinal axis of the housing.

In the preferred embodiments of the invention described below, each of the pins is fixed within an axially-extending cavity formed in the drive cylinder for each of the chuck jaws, each of the latter being formed with the bore at the same acute angle to the longitudinal axis of the housing and receiving the pins of the drive cylinder.

According to a further feature of the present invention, each of said chuck jaws includes an inner drive arm coupled to the drive cylinder, and an outer workpiece-engaging arm carried by its respective drive arm for movement therewith to engage and disengage the workpiece when the chuck jaw is driven radially with respect to the longitudinal axis of the housing, each of said drive arms being of substantially cylindrical configuration and being movable in a bore of corresponding cylindrical configuration formed in the housing.

Multiple-jaw chucks constructed in accordance with the foregoing features provide a number of important advantages over the above-mentioned known constructions. Thus, the novel chuck constructed in accordance with the foregoing features does not require the costly, time-consuming and high-precision machining operations of the previously-mentioned chucks, and therefore can be produced at substantially lower cost. Moreover, the mating surfaces between the chuck jaws and the housing through which the jaws move include less sharp corners than the known constructions, which substantially decreases the possibility for the entry of dirt particles between them and thereby contributes to a much longer useful life for the chuck.

A further important advantage, discovered virtually by accident, is that multiple-jaw chucks constructed in accordance with the foregoing features are self-locking in the event of interruption of the pressurized fluid supply, e.g. air, to the drive cylinder. Thus, in the conventional multiple-jaw chuck constructions such as interruption in the force applied to the chuck may result not only in the workpiece being suddenly released, but may also result in the workpiece being set into motion at a high velocity, which could cause a serious injury. A number of complicated arrangements have been provided to impart a self-locking construction to multiple-jaw chucks wherein the jaws would automatically lock in place in the event of an interruption in the pressurized air supply, but these self-locking arrangements are usually of complicated and expensive construction. However, it was found that such a self-locking effect is produced in the construction of the present invention, particularly by the acutely-angled pins received in the acutely-angled bores of the chuck jaws, which construction, in the event of interruption of the power source driving the cylinder, produces a rotary moment of the chuck jaws tending to lock them on the pins.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF PREFERRED EMBODIMENTS

Figure 1:
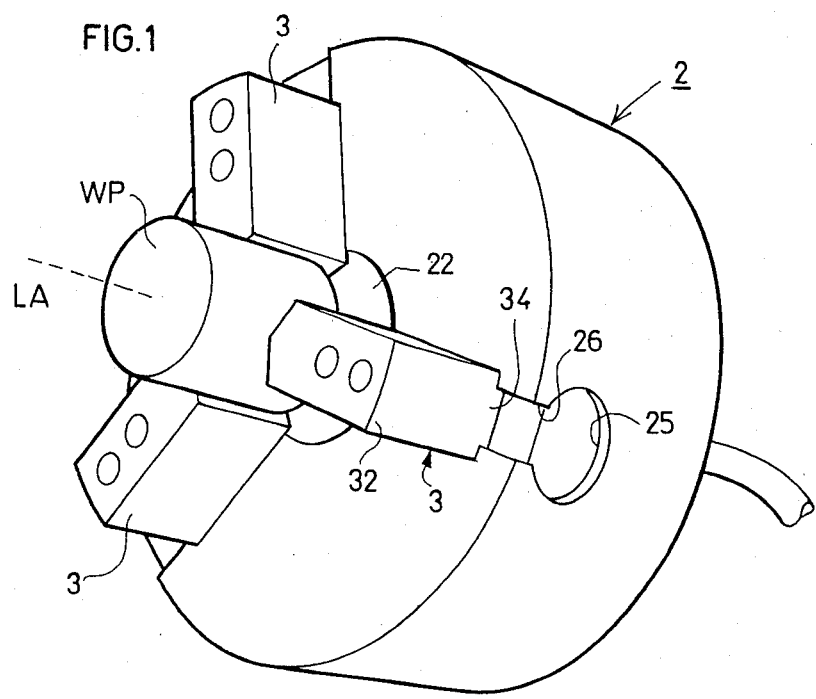
FIG. 1 is a three-dimensional view illustrating one form of multiple-jaw chuck constructed in accordance with the present invention.
Figure 2:
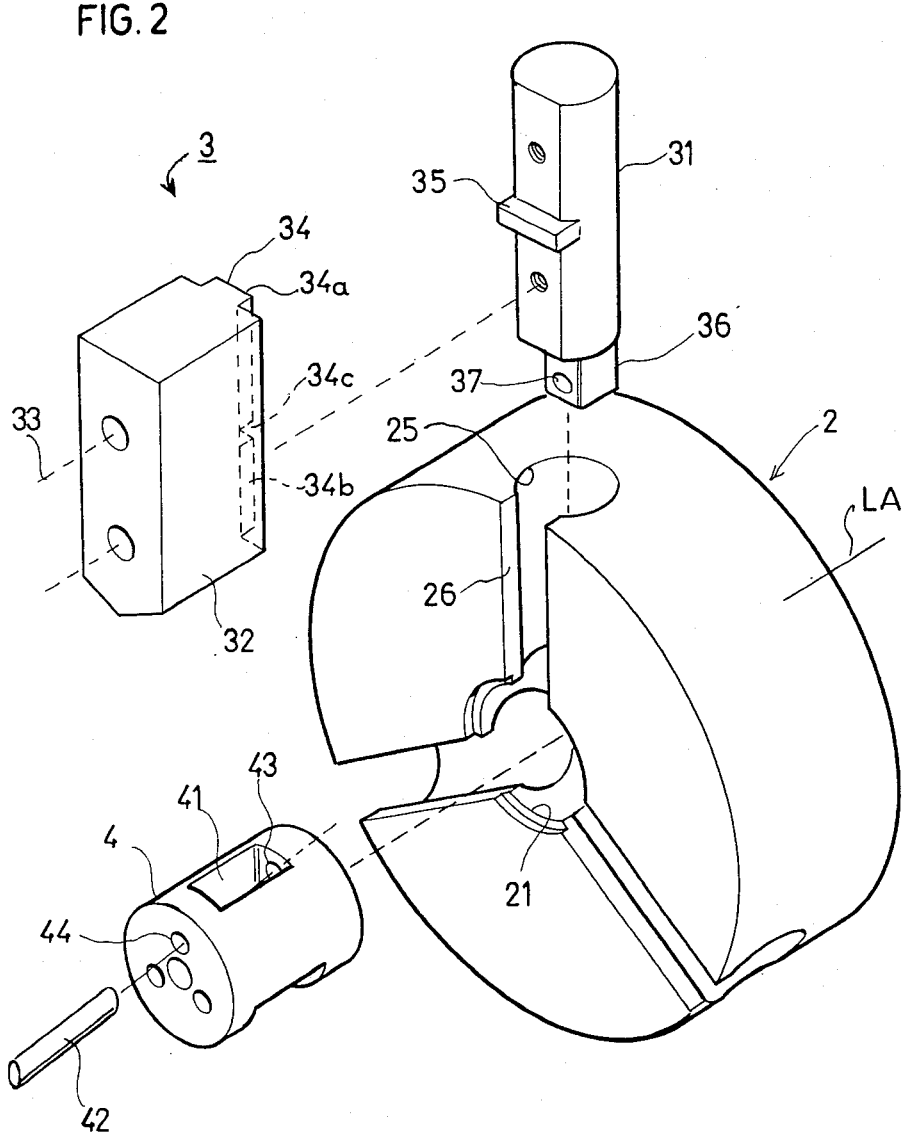
FIG. 2 is an exploded view illustrating the main components of the chuck of FIG. 1.

With reference first to FIGS. 1 and 2, there is illustrated a chuck comprising a housing 2 carrying three chuck jaws, each generally designated 3, movable radially with respect to the housing 2, i.e., towards and away from its longitudinal axis LA, in order to engage or disengage a workpiece WP. As known, such chucks may be pneumatically driven by a drive cylinder 4 (FIG. 2) disposed within housing 2 and coupled to the three chuck jaws 3 so as to drive them radially towards and away from the housing axis LA when the drive cylinder 4 is driven parallel to the housing axis.

As shown particularly in FIG. 2, housing 2 is of cylindrical shape and is formed with a central cylindrical bore 21 whose outer end is closed by a cover plate 22 (FIG. 1) flush with the respective face of the housing. Drive cylinder 4 is received within housing bore 21 and is driven, e.g. by a known pneumatic drive (not shown), parallel to the axis LA of the housing 2 and of its bore 21.

Housing 2 is further formed with three equally-spaced cylindrical bores 25 extending in the radial direction, there being one such bore 25 for each of the chuck jaws 3. As shown particularly in FIG. 2, each cylindrical bore 25 joins a rectangular slot 26 formed in the outer face of housing 2. Slot 26 serves as a keying slot for the respective chuck jaw 3, as will be described more particularly below, and has a width of approximately one-half the diameter of its respective bore 25.

Each of the three chuck jaws 3 is constituted of two main members, namely an inner drive arm 31 movable within its bore 25 of the housing 2, and an outer workpiece-engaging arm 32 projecting outwardly of the housing for engaging the workpiece. The workpiece-engaging arm 32 is coupled to its drive arm 31 by means of threaded fasteners, shown schematically at 33, passing through openings in both of these members.

The inner face of the workpiece-engaging arm 32 coupled to the drive arm 31 is formed with a keying rib 34 receivable within keying slot 26 of the housing 2, for constraining the movement of the respective chuck jaw to a rectilinear movement, i.e., for preventing the chuck jaw from rotating within its housing bore 25. As shown particularly in FIG. 2, keying rib 34 is made of two sections, 34a and 34b, separated by a central transverse slot or recess 34c; and the confronting face of the drive arm 31 of the respective chuck jaw is formed with a transversely-extending rib 35 received within recess 34c. Thus, when the workpiece-engaging arm is secured by fasteners 33 to the drive arm 31 of its respective chuck jaw 3, rib 35 is received within recess 34c and serves, together with the two keying rib sections 34a and 34b on the inner face of the workpiece-engaging arm 32, to assure that the chuck jaw may move only in the radial direction and cannot rotate within the cylindrical bore 25.

As also shown in FIG. 2, the inner end of the drive arm 31 of each chuck jaw includes an extension 36 having a bore 37 extending axially of the chuck and formed at an acute angle to its longitudinal axis 4. Extension 36 is coupled to the drive cylinder 4, the latter being formed with a cavity or recess 41 for such extension in each of the chuck jaws 3. A pin 42 is fixed within each cavity 41 between a pair of bores 43, 44 formed through the cavity end walls. Bores 43 and 44, and the pin 42 secured within them, form the same acute angle as bore 37 in the chuck drive arm extension 36.

The chuck jaws 3 are coupled to the drive cylinder 4 by means of the pins 42 which are passed through bores 43, 44 in the drive cylinder and bore 37 in the end extensions 36 of the chuck jaws. To facilitate making this coupling, one of the bores in the drive cylinder 4 (e.g., bore 43) is of slightly smaller diameter than its mating bore, so that the coupling pin 42 may be passed through the larger drive cylinder bore, then through bore 37 of the respective chuck drive arm 31 and then through the smaller-diameter bore of the drive cylinder 4, which latter bore wedges and firmly fixes the pin in place within the respective cavity 41 of the cylinder. In addition, each cavity 41 of the drive cylinder has a width substantially equal to that of the respective extension 36 of the chuck jaw, but a length substantially larger than the extension, as shown particularly in FIGS. 3 and 4, to permit the drive cylinder 4 to move axially with respect to the chuck jaws 3.

Figure 3:
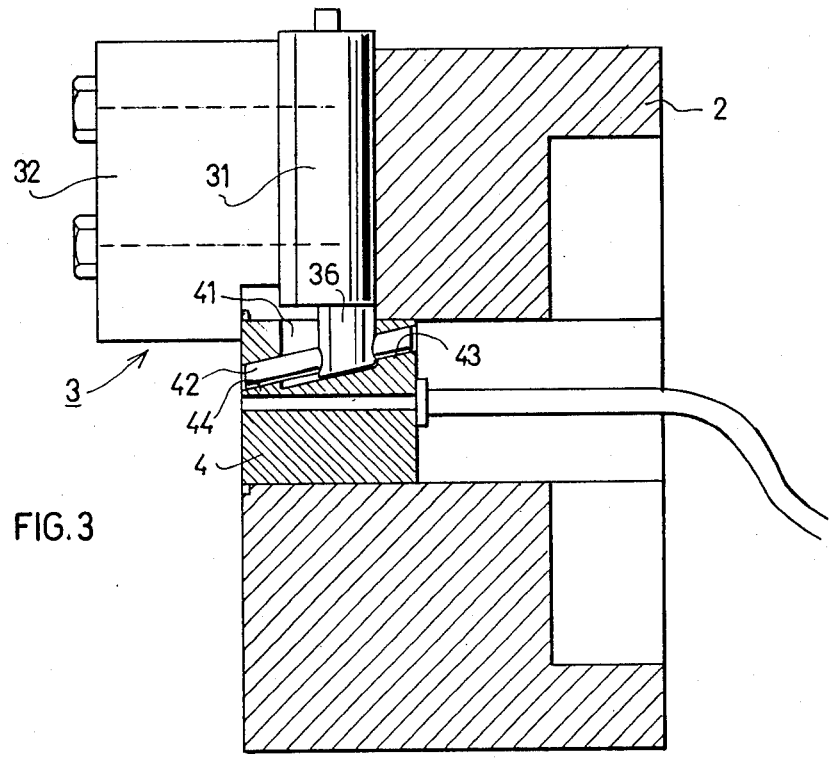
FIG. 3 is a transverse sectional view of the chuck of FIGS. 1 and 2 with the illustrated chuck jaw in its outer, or workpiece-releasing position.
Figure 4:
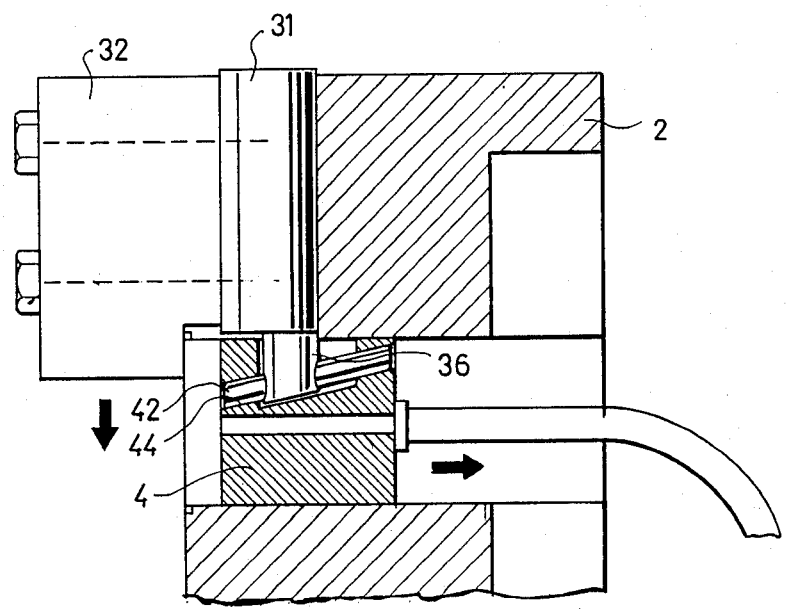
FIG. 4 is a fragmentary view corresponding to that of FIG. 3 but showing the chuck jaw in its inner, or workpiece-engaging, position.

FIGS. 3 and 4 illustrate the manner in which drive cylinder 4 moves the chuck jaws 3 in the radial direction to engage or disengage the workpiece. Thus, as shown in FIG. 3, when the drive cylinder 4 is in its outermost (leftmost) position, the chuck jaws 3 are in their radially outermost position disengaging the workpiece; and when the drive cylinder 4 is driven rightwardly, as shown in FIG. 4, its pin 42 received within bore 37 of each chuck jaw 3 causes the jaws to move radially inwardly to engage the workpiece. The magnitude of radial movement of the chuck jaws 3 in relation to the axial movement of the drive cylinder 4 depends on the angle formed by the coupling pins 42 to the longitudinal axis of the chuck. Preferably, this acute angle is between 5–15 degrees, an angle of approximately 10 degrees having been found highly satisfactory for most applications.

It will be appreciated that other forms of work-engaging arms may be attached to the drive arms 31 of each chuck jaw 3. Actually, it is contemplated that the multiple-jaw chuck would include several different types of workpiece-engaging arms, corresponding to arm 32 in FIGS. 1–4, removably attachable to the drive arms 31 of the chuck jaws, for selective use according to the particular type of workpiece to be gripped by the chuck.

Figure 5:
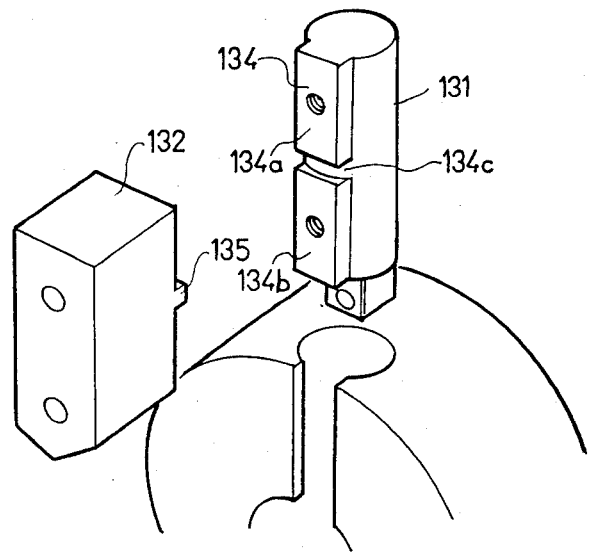
FIG. 5 is a fragmentary view illustrating a modification in the construction of the chuck of FIGS. 1-4.

In the illustrated embodiments, the keying rib on each chuck jaw movable within the keying slot of the chuck housing for constraining the movement of the chuck jaw to a rectilinear path, is formed on the inner face of the workpiece-engaging arm (32), but it will be appreciated that it could also be formed on the drive arm (31) of the respective chuck jaw. FIG. 5 illustrates such an arrangement wherein this keying rib, therein designated 134, is integrally formed with the drive arm 131 of the chuck jaw, rather than with the workpiece-engaging arm 132. The keying rib 134 in FIG. 5 could otherwise be of the same construction as keying rib 34 in FIGS. 1 and 2, namely, to include the two sections 134a, 134b separated by a recess 134c into which is inserted a transversely-extending rib 135 carried by the other member, in this case by the workpiece-engaging arm 132, of the respective chuck jaw.

Figure 6:
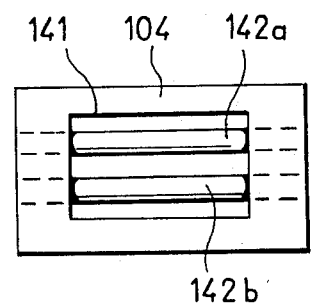
FIG. 6 is a top view illustrating a further modification in the construction of the chuck of FIGS. 1-4.

FIG. 6 illustrates a further modification wherein the drive cylinder, therein designated 104, is provided with a cavity 141 accommodating two coupling pins 142a, 142b in parallel, side-by-side relationship, instead of one pin. These two pins extend at an acute angle to their longitudinal axis and are received within two inclined bores (not shown) in the end extension of each chuck jaw, corresponding to bore 37 in end extension 36 of each chuck jaw in the FIGS. 1–4 embodiment as described above.

Many other variations, modifications and applications of the invention will be apparent.

What is claimed is:

1. A multiple-jaw chuck for clamping workpieces, comprising a housing having a longitudinal axis and a drive cylinder driven parallel to said longitudinal axis and driving a plurality of chuck jaws towards and away from said longitudinal axis, characterised in that said drive cylinder includes an axially-extending pin for each of said chuck jaws which pins are fixed to the drive cylinder at an acute angle to the longitudinal axis of the housing, each of said chuck jaws including a bore formed at the same acute angle to the longitudinal axis of the housing and receiving said pin, such that each of said chuck jaws is driven radially towards and away from said longitudinal axis of the housing when the drive cylinder is driven parallel to the longitudinal axis of the housing.

2. The chuck according to claim 1, wherein each of said pins is fixed within an axially-extending cavity formed in said drive cylinder for each of said chuck jaws.

3. The chuck according to claim 2, wherein each of said chuck jaws includes an extension at its inner end formed with said bore and received in its respective cavity of the drive cylinder.

4. The chuck according to claim 1, wherein said pins in said drive cylinder, and said bores in said chuck jaws, are each formed at an acute angle of 5–15 degrees to the longitudinal axis of the housing.

5. The chuck according to claim 4, wherein said acute angle is 10 degrees to the longitudinal axis of the housing.

6. The chuck according to claim 1, wherein each of said chuck jaws includes an inner drive arm coupled by said pin to the drive cylinder, and an outer workpiece-engaging arm carried by its respective drive arm for movement therewith to engage and disengage the workpiece when the chuck jaw is driven radially with respect to the longitudinal axis of the housing, each of said drive arms being of substantially cylindrical configuration and being movable in a bore of corresponding cylindrical configuration formed in the housing.

7. A multiple-jaw chuck for clamping workpieces, comprising a housing having a longitudinal axis and a drive cylinder driven parallel to the longitudinal axis of the housing and driving a plurality of chuck jaws towards and away from said housing longitudinal axis, characterised in that each of said chuck jaws includes an inner drive arm coupled to the drive cylinder, and an outer workpiece-engaging arm carried by its respective drive arm for movement therewith to engage and disengage the workpiece when the chuck jaw is driven radially with respect to the longitudinal axis of the housing, each of said drive arms being of substantially cylindrical configuration and being movable in a bore of corresponding cylindrical configuration formed in the housing, each of said inner chuck jaw drive arms being coupled to said drive cylinder by a pin fixed to one received in a bore formed in the other, both extending at an acute angle to the longitudinal axis of the housing, such that each of said chuck jaws is driven radially towards and away from said longitudinal axis of the housing when the drive cylinder is driven parallel to the longitudinal axis of the housing.

8. The chuck according to claim 7, wherein said pin of each drive arm is fixed to the drive cylinder at an acute angle to the longitudinal axis of the housing, and each of said drive arms is formed with said bore at the same acute angle to the longitudinal axis of the housing.

9. The chuck according to claim 8, wherein each of said pins is fixed within an axially-extending cavity formed in said drive cylinder for each of said chuck jaws.

10. The chuck according to claim 7, wherein each of said housing bores is formed with a keying slot receiving a keying rib formed in the respective chuck jaw for constraining the chuck jaw to a rectilinear movement when driven by the drive cylinder.

11. The chuck according to claim 10, wherein said housing includes a flat outer face facing the workpiece, each of said keying slots being formed in said outer face.

12. The chuck according to claim 10, wherein said inner drive arm and said outer work-engaging arm of each of said chuck jaws are constituted of separate members coupled together by removable fasteners, one of said members being formed with said keying rib movable in said keying slot of said housing.

13. The chuck according to claim 12, wherein said keying rib formed in one of said members of each chuck jaw is divided into two sections separated by a recess extending transversely to the axis of the keying rib and receiving a rib formed in said other member of the respective chuck jaw.

14. The chuck according to claim 12, wherein said keying rib is formed in said workpiece-engaging member on the surface thereof facing the drive arm to which it is coupled in the respective chuck jaw.

15. A multiple-jaw chuck for clamping workpieces, comprising a housing having a longitudinal axis and a drive cylinder driven parallel to said longitudinal axis and driving a plurality of chuck jaws towards and away from said longitudinal axis, characterized in that each of said chuck jaws is coupled to the drive cylinder by a pin fixed to one received in a bore formed in the other with both pin and bore extending at the same acute angle to said longitudinal axis of the housing, such that each of said chuck jaws is driven radially towards and away from said longitudinal axis when the drive cylinder is driven parallel to said longitudinal axis.

* * * * *